United States Patent
Aher et al.

(10) Patent No.: US 11,960,538 B2
(45) Date of Patent: Apr. 16, 2024

(54) QUERY SYSTEM WITH SPOILER PREVENTION

(71) Applicant: Rovi Guides, Inc., San Jose, CA (US)

(72) Inventors: Ankur Anil Aher, Maharashtra (IN); Charishma Chundi, Andhra Pradesh (IN)

(73) Assignee: Rovi Guides, Inc., San Jose, CA (US)

( * ) Notice: Subject to any disclaimer, the term of this patent is extended or adjusted under 35 U.S.C. 154(b) by 0 days.

(21) Appl. No.: 18/142,394

(22) Filed: May 2, 2023

(65) Prior Publication Data

US 2023/0273956 A1  Aug. 31, 2023

Related U.S. Application Data

(63) Continuation of application No. 17/954,973, filed on Sep. 28, 2022, now Pat. No. 11,675,834, which is a continuation of application No. 16/887,945, filed on May 29, 2020, now Pat. No. 11,461,391.

(51) Int. Cl.
| | | |
|---|---|---|
| *G06F 16/73* | (2019.01) | |
| *G06F 16/735* | (2019.01) | |
| *G06F 16/738* | (2019.01) | |
| *G06F 16/74* | (2019.01) | |
| *G06F 16/783* | (2019.01) | |

(52) U.S. Cl.
CPC .......... *G06F 16/739* (2019.01); *G06F 16/735* (2019.01); *G06F 16/745* (2019.01); *G06F 16/7837* (2019.01)

(58) Field of Classification Search
CPC .. G06F 16/739; G06F 16/745; G06F 16/7837; G06F 16/735
See application file for complete search history.

(56) References Cited

U.S. PATENT DOCUMENTS

| | | |
|---|---|---|
| 7,984,472 B2 | 7/2011 | Incentis |
| 2014/0101706 A1* | 4/2014 | Kardatzke .......... H04N 21/4622 725/86 |
| 2017/0025152 A1 | 1/2017 | Jaime et al. |
| 2017/0311040 A1 | 10/2017 | Barnes |
| 2018/0152759 A1* | 5/2018 | Miller ................. G06F 16/2455 |
| 2018/0199080 A1* | 7/2018 | Jackson, Jr. ....... H04N 21/8549 |
| 2021/0374179 A1 | 12/2021 | Aher et al. |
| 2023/0014020 A1 | 1/2023 | Aher et al. |

FOREIGN PATENT DOCUMENTS

WO  2019125422 A1  6/2019

* cited by examiner

*Primary Examiner* — Nicholas T Corbo
(74) *Attorney, Agent, or Firm* — Haley Guiliano LLP

(57) ABSTRACT

Systems and methods for generating a reply to a query are provided. A query about an event in a content recording during playback of the content recording is received. A type of the event based on the query is determined. A playback position in a timeline of the content recording is determined. Based on the type of the event, an event distribution table is obtained, the table comprising one or more event identifiers and one or more corresponding occurrence times for the one or more event identifiers in the timeline of the content recording. The playback position of the content recording to the one or more occurrence times is compared. A reply to the query is generated, for aural or visual presentation, the reply being based on a result of the comparing, the reply comprising data about at least one event corresponding to the one or more event identifiers.

20 Claims, 9 Drawing Sheets

QUERY SYSTEM WITH SPOILER PREVENTION

CROSS-REFERENCE TO RELATED APPLICATION

This application is a continuation of U.S. patent application Ser. No. 17/954,973, filed Sep. 28, 2022, which is a continuation of U.S. patent application Ser. No. 16/887,945, filed May 29, 2020, now U.S. Pat. No. 11,461,391, the disclosures of each are incorporated by reference in their entireties.

BACKGROUND

The present disclosure relates to query processing and, more particularly, to systems and related processes for responding to a query about an event in a content recording during playback of the content recording.

SUMMARY

When a user is watching a content via an electronic device, they may have a question about an event that has occurred. In this case, an electronic device may include a query interface, for instance, with a natural language processing system, that enables the user to enter a query about an event that has occurred. The system may process the query, analyze a database about the events that have occurred, and generate a reply. However, when the content is a recorded content, the system may have access to events that have not been played back yet. If the system generates a reply based on such events, the reply may include one or more spoilers that reveal information about an event in the content that the user has not yet viewed during playback.

For instance, when the content recording is a soccer game and there was a goal at t=5 min, the user at a playback position of t=30 min may want to know who scored the goal. However, as the query often does not comprise a time marker and as the system has access to events that occur during the whole timeline of the soccer game, the system may reply with information related to a goal that occurred after t=30 min. The user's experience may thus be spoiled.

In view of the foregoing, the present disclosure provides systems and related methods that generate a reply to a query about an event in a content recording, during playback of the content recording, while preventing spoiling. According to one example method, a query about an event in a content recording is received during playback of the content recording. A type of the event is determined based on the query. A playback position in a timeline of the content recording is then determined. Based on the type of the event, an event distribution table is obtained, and/or generated, including one or more event identifiers and one or more corresponding occurrence times for the one or more event identifiers in the timeline of the content recording. The obtaining the event distribution table may include, for instance, extracting data from an event distribution table which includes events unrelated to the query. In another aspect, the event distribution table may be obtained based on metadata associated with events of the content recording. The playback position of the content recording is compared to the one or more occurrence times. Based on a result of the comparing, a reply, including data about at least one event corresponding to the one or more event identifiers, is generated for aural or visual presentation.

In another aspect, the comparing includes determining that each of the one or more occurrence times occurs prior to the playback position in the timeline of the content recording, and the reply is generated comprising data about each of the events corresponding to the one or more event identifiers.

In a further example, the comparing includes determining that each of the one or more occurrence times occurs after the playback position in the timeline of the content recording, and the generating the reply includes generating, for aural or visual presentation, a request for confirmation that the reply should comprise data regarding at least one event corresponding to the one or more event identifiers despite the at least one event occurring after the playback position.

The comparing in some aspects may include determining that at least one of the one or more occurrence times occurs prior to the playback position in the timeline of the content recording and at least one of the one or more occurrence times occurs after the playback position in the timeline of the content recording. In such aspects the generating the reply may include generating a request to specify the query.

The method, in some examples, may further include receiving an input specifying the query, and filtering the event distribution table based on the received input to generate a filtered event distribution table including fewer event identifiers than the event distribution table included prior to the filtering. The reply may then be generated based on the filtered event distribution table.

The comparing, in another aspect, may include determining that at least one of the one or more occurrence times occurs prior to the playback position in the timeline of the content recording and at least one of the one or more occurrence times occurs after the playback position in the timeline of the content recording. The reply may then be generated to include data about at least one event corresponding to the one or more event identifiers having an occurrence time prior to the playback position in the timeline.

In yet a further example, the comparing may include determining that at least one of the one or more occurrence times occurs prior to the playback position in the timeline of the content recording and at least one of the one or more occurrence times occurs after the playback position in the timeline of the content recording. The generating the reply may then include generating a request for confirmation that the reply should comprise data regarding at least one event corresponding to the one or more event identifiers having an occurrence time occurring after the playback position in the timeline.

BRIEF DESCRIPTION OF THE DRAWINGS

The above and other objects and advantages of the disclosure will be apparent upon consideration of the following detailed description, taken in conjunction with the accompanying drawings, in which.

DETAILED DESCRIPTION

Figure 1:
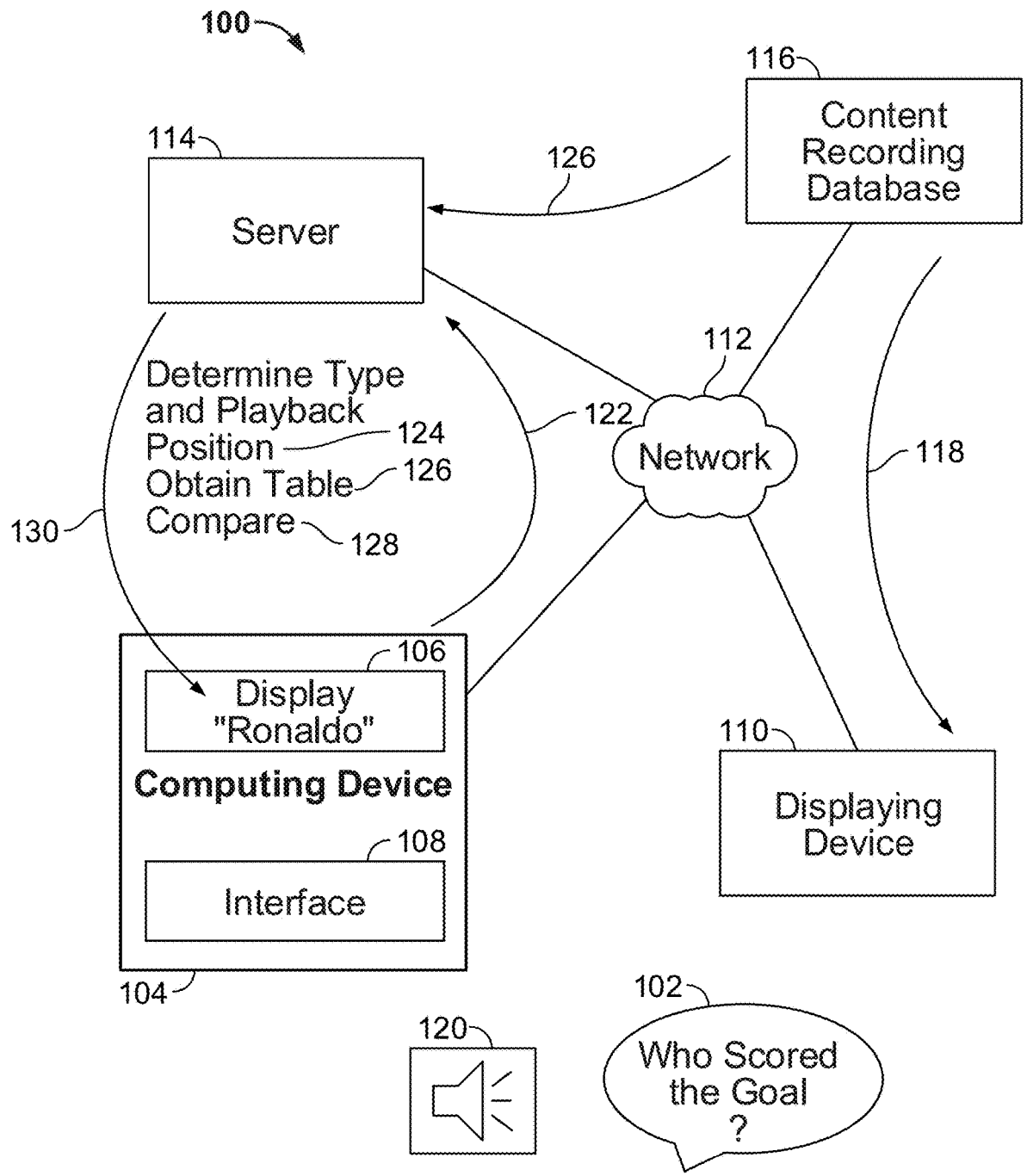
FIG. 1 is an illustrative block diagram showing a scenario for responding to a query about an event in a content recording during playback of the content recording, in accordance with some embodiments of the disclosure.

FIG. 1 illustrates an overview of a scenario in which a system 100 handles a query 102 about an event in a content recording during playback of the content, the query lacking specification of time marker of the query, in accordance with some embodiments of the disclosure. An example of a soccer match will be resorted to throughout the description.

System 100 includes a computing device 104, such as a smart phone, a smart television, a smart speaker, or the like, that has various user interfaces configured to interact with one or more nearby users. In some examples, device 104 has a display 106, which is configured to display information via a graphical user interface, and an interface 108, such as a voice-user interface, which is configured to receive a query 102 as it is uttered by a nearby user (not shown in FIG. 1). In other embodiments, device 104 has an audio driver, such as a speaker or a screen (not shown in FIG. 1), configured to audibly or visually provide information, such as query responses, to one or more users. System 100 also includes a displaying device 110 to display the content recording to the user, such as a television, a smart television, a mere screen, a computer, a laptop, a smartphone, etc. The displaying device 110 comprises typically a screen and a speaker (not shown). The displaying device 110 and the computing device 104 may be the same device.

System 100 also includes network 112, such as the Internet and/or a local network, one or more server(s) 114, and one or more content recording database(s) 116. Device 104 and server 114 are communicatively coupled to one another by way of network 112. Displaying device 110 and content recording database 116, and server 114 are communicatively coupled to content recording database 116 by way of one or more communication paths, such as a proprietary communication path and/or network 112. While a content recording retrieved from the content recording database 116 is being aired (118) on the display device 110 via network 112, device 104 receives (120) a query 102 (in this example, the query "Who scored the goal?") by way of the interface 108, for instance a natural language query by way of voice-user interface 108 and forwards (122) query 102 to server 114 via network 112. Server 114 determines (124), in a manner described in further detail below, on one hand a type of the event based on the query 102 (in this example the query is about a soccer player scoring a goal, and not about a foul or a red card) or on the other hand a playback position in a timeline of the content recording. Server 114 then obtain 126, based on the type of the event, an event distribution table (not shown on FIG. 1) comprising one or more identifiers and one or more corresponding times for the one or more event identifiers in the timeline of the content recording. The event distribution table can be obtained via the content recording database 116.

Then, based on comparing (128) the playback position of the content recording to the one or more occurrence times, the server 114 then returns (130) a reply to the query 102 based on a result of the comparing 128, for visual and/or aural presentation to the user via display 106 and/or audio interface (not shown in FIG. 1), respectively.

Figure 2:
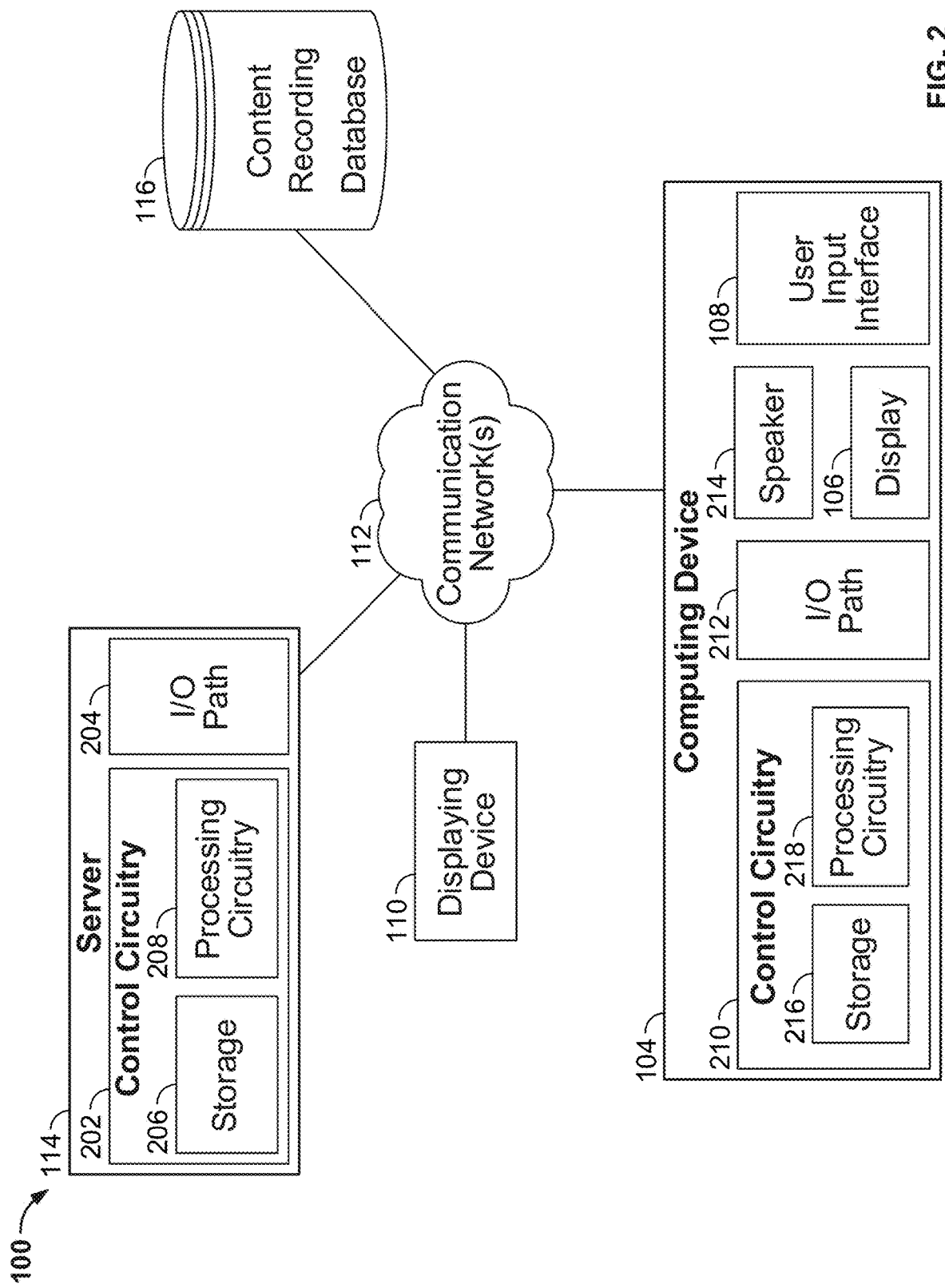
FIG. 2 is an illustrative block diagram showing a system for responding to a query about an event in a content recording during playback of the content recording, in accordance with some embodiments of the disclosure.

FIG. 2 is an illustrative block diagram showing additional details of an example of system 100 for responding to a query about an event in a content recording during playback of the content recording, in accordance with some embodiments of the disclosure. Although FIG. 2 shows system 100 as including a number and configuration of individual components, in some embodiments, any number of the components of system 100 may be combined and/or integrated as one device. System 100 includes computing device 104, displaying device 110, server 114, and content recording database 116, each of which is communicatively coupled to communication network 112, which may be the Internet or any other suitable network or group of networks. In some embodiments, system 100 excludes server 114, and functionality that would otherwise be implemented by server 114 is instead implemented by other components of system 100, such as computing device 104 or displaying device 110. In still other embodiments, server 114 works in conjunction with computing device 104 to implement certain functionality described herein in a distributed or cooperative manner. In still other embodiments, computing device 104 and displaying device 110 are the same device or two sub devices of same device (such as a remote and a smart TV).

Server 114 includes control circuitry 202 and input/output (hereinafter "I/O") path 204, and control circuitry 202 includes storage 206 and processing circuitry 208. Computing device 104 and/or displaying device 110, which may be a personal computer, a laptop computer, a tablet computer, a smartphone, a smart television, a smart speaker, or any other type of computing device, includes control circuitry 210, I/O path 212, speaker 214, display 106, and user input interface 108, which in some embodiments includes a voice-user interface configured to receive natural language queries uttered by users in proximity to computing device 104. Control circuitry 210 includes storage 216 and processing circuitry 218. Control circuitry 202 and/or 210 may be based on any suitable processing circuitry such as processing circuitry 208 and/or 218. As referred to herein, processing circuitry should be understood to mean circuitry based on one or more microprocessors, microcontrollers, digital signal processors, programmable logic devices, field-programmable gate arrays (FPGAs), application-specific integrated circuits (ASICs), etc., and may include a multi-core processor (e.g., dual-core, quad-core, hexa-core, or any suitable number of cores). In some embodiments, processing circuitry may be distributed across multiple separate processors, for example, multiple of the same type of processors (e.g., two Intel Core i9 processors) or multiple different processors (e.g., an Intel Core i7 processor and an Intel Core i9 processor).

Each of storage 206, storage 216, and/or storages of other components of system 100 (e.g., storages of content recording database 116, and/or the like) may be an electronic storage device. As referred to herein, the phrase "electronic storage device" or "storage device" should be understood to mean any device for storing electronic data, computer software, or firmware, such as random-access memory, read-only memory, hard drives, optical drives, digital video disc (DVD) recorders, compact disc (CD) recorders, BLU-RAY disc (BD) recorders, BLU-RAY 3D disc recorders, digital video recorders (DVRs, sometimes called personal video recorders, or PVRs), solid state devices, quantum storage devices, gaming consoles, gaming media, or any other suitable fixed or removable storage devices, and/or any combination of the same. Each of storage 206, storage 216, and/or storages of other components of system 100 may be used to store various types of content, metadata, and or other types of data. Non-volatile memory may also be used (e.g., to launch a boot-up routine and other instructions). Cloud-based storage may be used to supplement storages 206, 216 or instead of storages 206, 216. In some embodiments, control circuitry 202 and/or 210 executes instructions for an application stored in memory (e.g., storage 206 and/or 216). Specifically, control circuitry 202 and/or 210 may be instructed by the application to perform the functions discussed herein. In some implementations, any action performed by control circuitry 202 and/or 210 may be based on instructions received from the application. For example, the application may be implemented as software or a set of executable instructions that may be stored in storage 206 and/or 216 and executed by control circuitry 202 and/or 210. In some embodiments, the application may be a client/server application where only a client application resides on computing device 104, and a server application resides on server 114.

The application may be implemented using any suitable architecture. For example, it may be a stand-alone application wholly implemented on computing device 104. In such an approach, instructions for the application are stored locally (e.g., in storage 216), and data for use by the application is downloaded on a periodic basis (e.g., from an out-of-band feed, from an Internet resource, or using another suitable approach). Control circuitry 210 may retrieve instructions for the application from storage 438 and process the instructions to perform the functionality described herein. Based on the processed instructions, control circuitry 210 may determine what action to perform when input is received from user input interface 108.

In client/server-based embodiments, control circuitry 210 may include communication circuitry suitable for communicating with an application server (e.g., server 114) or other networks or servers. The instructions for carrying out the functionality described herein may be stored on the application server. Communication circuitry may include a cable modem, an Ethernet card, or a wireless modem for communication with other equipment, or any other suitable communication circuitry. Such communication may involve the Internet or any other suitable communication networks or paths (e.g., communication network 112). In another example of a client/server-based application, control circuitry 210 runs a web browser that interprets web pages provided by a remote server (e.g., server 114). For example, the remote server may store the instructions for the application in a storage device. The remote server may process the stored instructions using circuitry (e.g., control circuitry 202) and/or generate displays. Computing device 104 may receive the displays generated by the remote server and may display the content of the displays locally via display 106. This way, the processing of the instructions is performed remotely (e.g., by server 114) while the resulting displays, such as the display windows described elsewhere herein, are provided locally on computing device 104. Computing device 104 may receive inputs from the user via input interface 108 and transmit those inputs to the remote server for processing and generating the corresponding displays.

A user may send instructions to control circuitry 202 and/or 210 using user input interface 108. User input interface 108 may be any suitable user interface, such as a remote control, trackball, keypad, keyboard, touchscreen, touchpad, stylus input, joystick, voice recognition interface, gaming controller, or other user input interfaces. User input interface 108 may be integrated with or combined with display 106, which may be a monitor, a television, a liquid crystal display (LCD), an electronic ink display, or any other equipment suitable for displaying visual images.

Server 114 and computing device 104 may transmit and receive content and data via I/O path 204 and 212, respectively. For instance, I/O path 204 and/or I/O path 212 may include a communication port configured to transmit and/or receive (for instance to and/or from content recording database 116), via communication network 112, content item identifiers, natural language queries, and/or other data. Control circuitry 202, 210 may be used to send and receive commands, requests, and other suitable data using I/O paths 204, 212.

Figure 3:
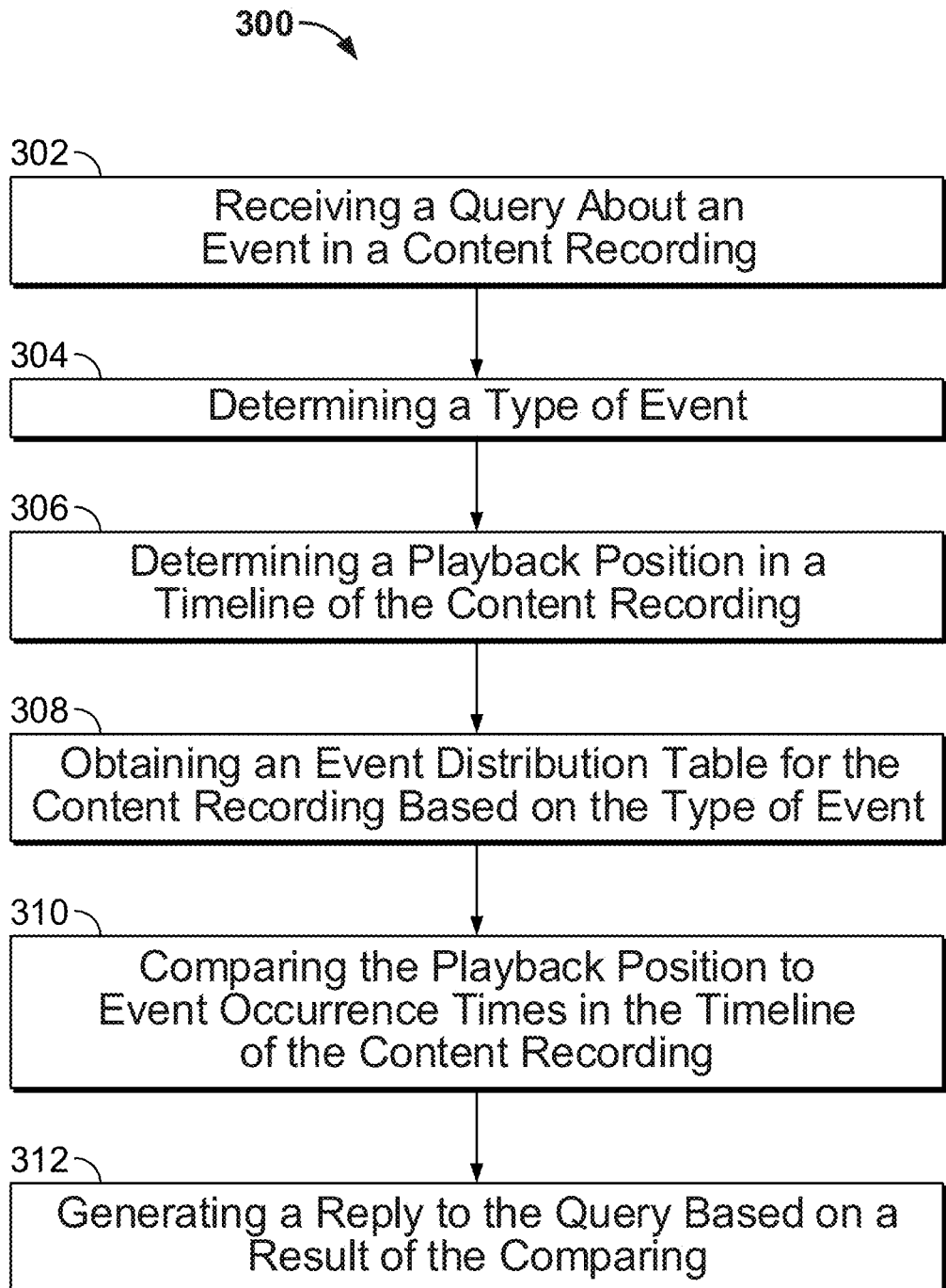
FIG. 3 depicts an illustrative flowchart of a process for responding to query about an event in a content recording during playback of the content recording, in accordance with some embodiments of the disclosure.

Having described system 100, reference is now made to FIG. 3, which depicts an illustrative flowchart of process 300 for responding to a query about an event in a content recording during playback of the content, which may be implemented by system 100, in accordance with some embodiments of the disclosure. In various embodiments, individual steps of process 300, or any process described herein, may be implemented by one or more components of system 100. Although the present disclosure may describe certain steps of process 300 (and of other processes described herein) as being implemented by certain components of system 100, this is for purposes of illustration only, and other components of system 100 may implement those steps instead. At 302, control circuitry 202 receives a query, such as query 102 described above, by way of an interface, such a voice-user interface 108, and communication network 112. The query is about an event in a content recording during playback of that event recording. The event recording may be stored on the content recording database 116.

At 304, control circuitry 202 determines a type of the event based on the query. In an embodiment, the query is a natural language query and control circuitry 202 feeds the terms and/or structure of the natural language query that was received at 302 into a named-entity recognition (NER) algorithm, such as NER algorithms provided by General Architecture for Text Engineering (GATE)™, Apache OpenNLP™, SpaCy™, or the like, to generate one or more named-entity recognition outputs. In some examples, the named-entity recognition outputs are generated by extracting names of entities mentioned in the query and/or entity types for those named entities by applying the terms of the query to a knowledge graph and/or using data scores. Using query 102 as an example ("Who scored the goal?") and executing a named-entity recognition algorithm, control circuitry 202 may identify that the type of event is "goal scored".

At 306, control circuitry 202 determines a playback position in a timeline of the content recording. The playback position is a time marker at which the content recording is currently being aired. The playback position is defined between an beginning and an end of a content recording. For example, when the content recording is being aired on the displaying device 110, the playback position progresses forward on the timeline; when the content recording is being paused, the playback position remains still. In some examples, control circuitry 202 receives the playback position from the computing device 104 or from displaying device 110. For instance, the playback position may be received along with the query 102. In some examples, control circuitry 202 receives the playback position from the content recording database 116.

Figure 9:
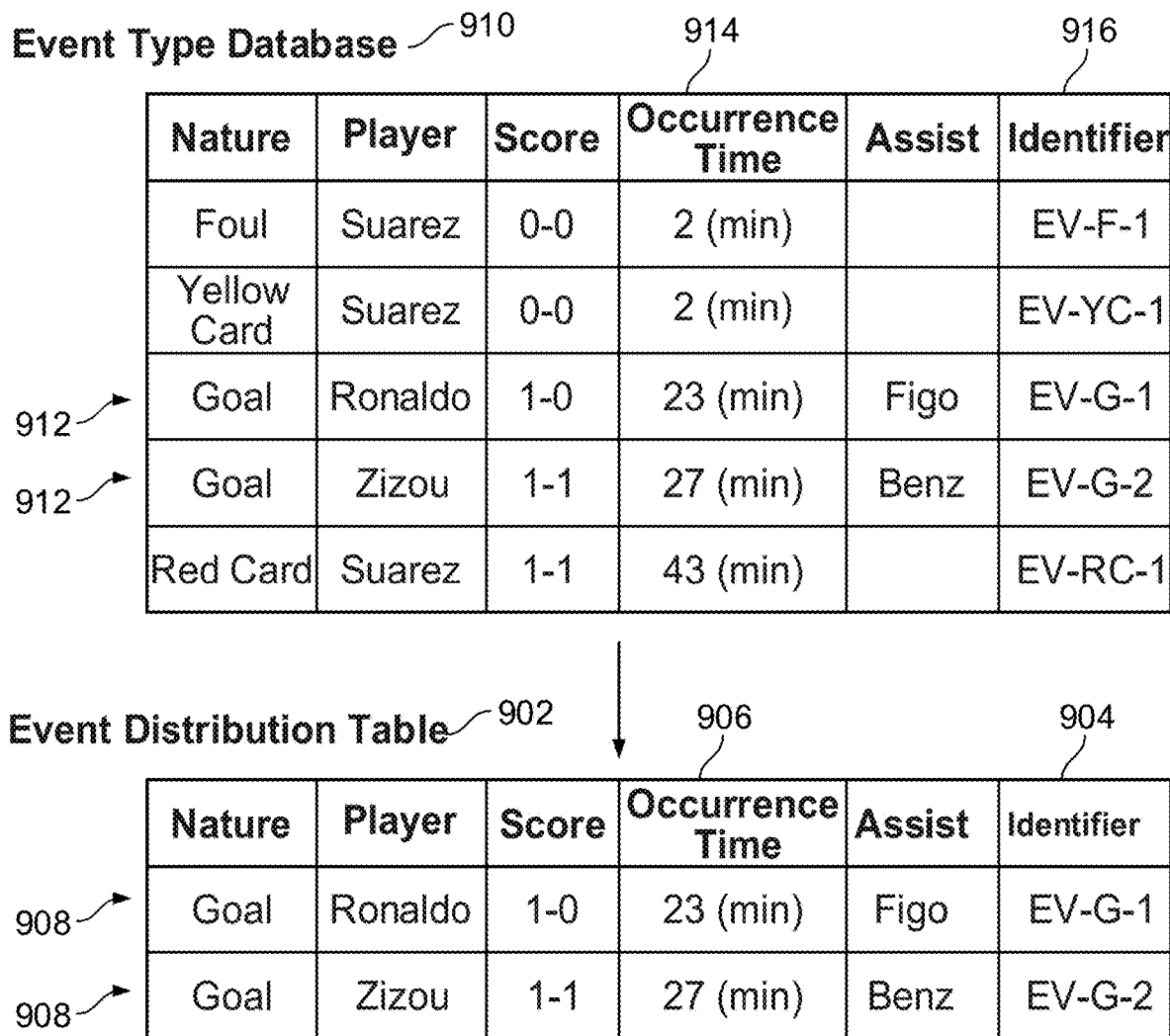
FIG. 9 depicts an illustrative representation of an event distribution table.

At 308, control circuitry 202 obtains an event distribution table 902 (shown on FIG. 9) based on the type of the event of the query. The event distribution table 902 is a table that comprises one or more event identifiers 904 and one or more corresponding occurrence times 906 for the one or more event identifiers 904 in the time of the content recording. More specifically the event distribution table 902 comprises every event 908 of the same type as that of the query. Each event 908 is associated with a unique identifier 904 and the identifier 904 is coupled with an occurrence time 906. An example of a structure of the event distribution table is given in FIG. 9 and more details therefore will be given later. In the example of query "who scored the goal?", the type of the event is "goal". Therefore the event distribution table is comprised of a list of all the goals occurring throughout the content recording, each goal being uniquely identified by an associated event identifier. The event distribution table 902 may be generated by the server 114, for instance based on metadata received from the content recording database 116. Alternatively the event distribution table 902 may be generated by the server 114 by analyzing the content recording and generating the metadata. More details are provided later.

In particular, the event distribution table 902 may be obtained without consideration of the playback position in the timeline of the content recording. In the example, even the goals that are not scored yet at the playback position are included in the event distribution table 902.

Determining 306 can occur before or after determining 304 or obtaining 308. FIG. 3 shows a linear processing but parallel processing is possible.

At 310, control circuitry 202 compares the playback position of the content recording to the one or more occurrence times 906 for the event identifiers 904 of the event distribution table 902. The position of each occurrence time 906 is therefore prior to, or after, the playback position. Control circuitry 202 is able to determine if all the occurrence times are prior to, or after, the playback position or if they are some prior to, and some after. Step 310 will be described in more detail later in relation to FIG. 4.

At 312, after comparing 310, control circuitry 202 generates a reply to the query 102 based on a result of the comparing 310. The reply comprises data about at least one event corresponding to the one or more event identifiers 904. Step 312 will be described in more detail later in relation to FIG. 4. The reply is generated for aural or visual presentation on the computing device 104, for instance by displaying the reply on display 106 or emitting a sound signal on speaker 214. Alternatively the reply may be generated to be presented on the displaying device 110. Data about an event corresponding to an event identifier may typically comprise the type of the event itself, its occurrence time and one or more value of event fields associated to the event identifier.

Figure 4:
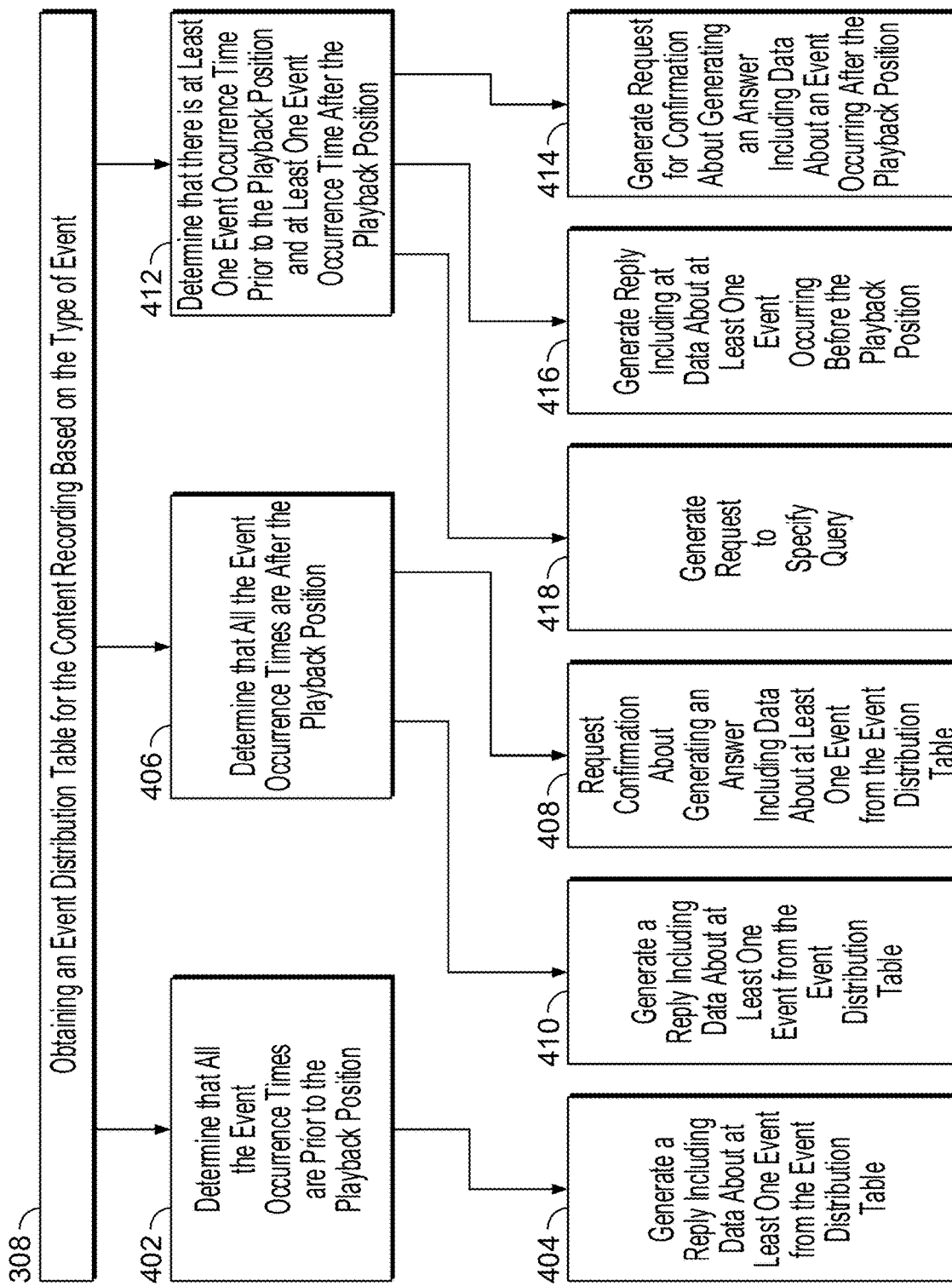
FIG. 4 depicts an illustrative flowchart representing different routes for the comparing and generating steps, in accordance with some embodiments of the disclosure.
Figure 5:
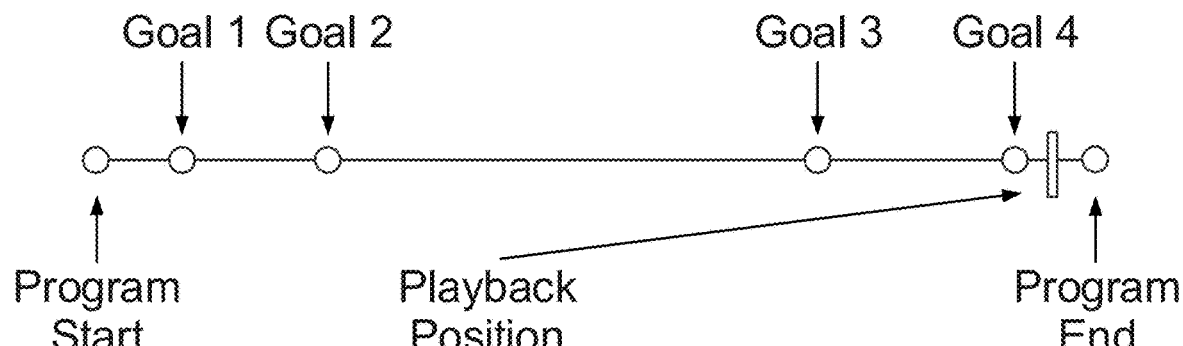
FIGS. 5 to 7 depict an illustrative recorded content of a soccer match, with three different situations, in accordance with some embodiments of the disclosure.

Having described flowchart 300, reference is now made to FIG. 4, which depicts an illustrative flowchart of different routes for steps 310 and 312. The reply to be generated depends on several factors, among which the relative position in the timeline of the content recording between the occurrence time of any event associated to the event identifier, and the playback position. The flowchart is exemplified with FIGS. 5, 6 and 7 which represent a timeline of a soccer match with four events of the type "goal" and three different playback position with respects to the goals.

In a first route, comparing 310 comprises determining 402 that each of the one or more occurrence times occur(s) prior to the playback position in the timeline of the content recording. This means that all the events of the same type of that of the query have already occurred at the playback position of the content recording—in other words the user is already aware of those events and no spoiler about them can be disclosed. For instance, as illustrated on FIG. 5, all four "goal" events have occurred prior to the playback position. As none of the information associated to those goals can be a spoiler to the user, generating 312 comprises generating 404 a reply comprising data about at least one, preferably each, of the events corresponding to the one or more identifiers.

In a second route, comparing 310 comprises determining 406 that each of the one or more occurrence times occur(s) after the playback position in the timeline of the content recording. This means that all the events of the same type of that of the query have not yet occurred at the playback position of the content recording—in other words the user is not aware of those events and spoiler about them can be disclosed. For instance, as illustrated on FIG. 6, all four "goal" events are to occur after the playback position. Different paths are possible. In a first path, generating 312 comprises generating 408 a request for confirmation that the reply should comprise data regarding at least one event corresponding to one or more event identifiers despite the at least one event occurrent after the playback position. Indeed, in the example of FIG. 6, the score is 0-0 when the query "Who scored the goal?" is received: either the user is mistaken and it is preferable to not return any data related to the goals occurring after the playback position, or the user is actually asking about the upcoming goals (voluntary spoiler). In a second path, generating 312 comprises generating 410 a reply comprising data about at least one, preferably each, of the events corresponding to the one or more identifiers. This is thus performed despite the fact that events associated with the event identifiers have not yet occurred in the content recording (voluntary spoiler). Alternatively, the second path disclosed here is performed after the user has confirmed his or her query, according to the first path disclosed here.

Figure 6:
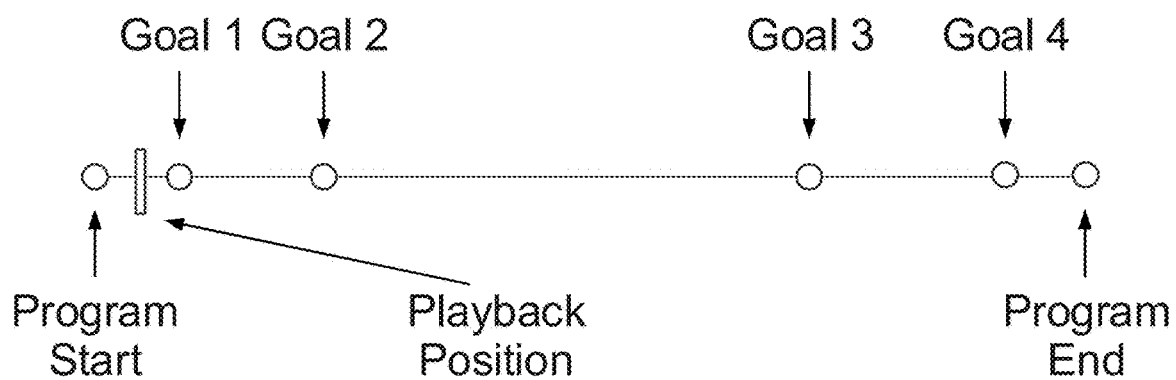
Figure 7:
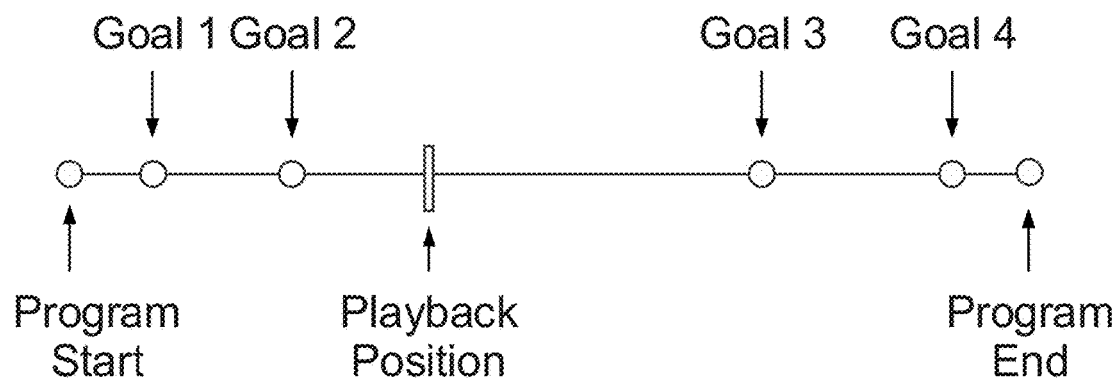

In a third route, comparing 310 comprises determining 412 that at least one of the one or more occurrence times occurs prior to the playback position and at least one of the one or more occurrence times occurs after the playback position. This means that some of the events of the same type of that of the query have already occurred and some have not—in other words the user is aware of some of those events and not aware of some of those events and spoiler about them can be disclosed. For instance, as illustrated on FIG. 7, two "goal" events have occurred prior to the playback position and two "goal" events are to occur after the playback position. Different paths are possible. In a first path, generating 312 comprises generating 414 a request for confirmation that the reply should comprise data regarding at least one event corresponding to the one or more event identifiers having an occurrence time occurring after the playback position in the timeline. In the example of FIG. 6, the score is 2-0, or 1-1 or 0-2 when query "Who scored the goal" is received: either the user wants to know about the past events, or the future event or all the events. In a second path, generating 312 comprises generating 416 a reply comprising data about at least one event corresponding to the one or more event identifiers having an occurrence time occurring before the playback position in the timeline. This cannot generate a spoiler to the user. In a third path, generating 312 comprises generating 418 a request to specify the query. This third embodiment will be better understood in relation with another example as shown on FIG. 8.

Figure 8:
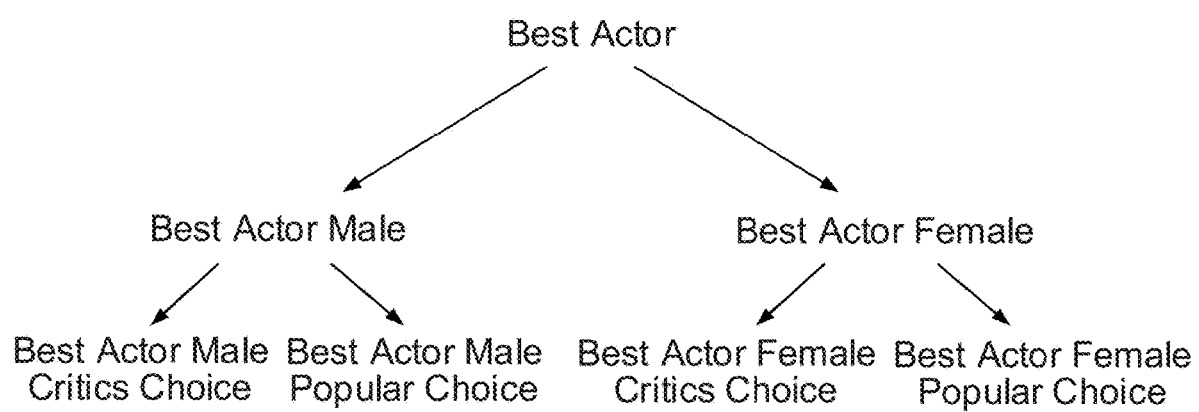
FIG. 8 depicts an illustrative representation of the level of specificity of events.

FIG. 8 illustrates a hierarchy of events that may be illustrated as part of the Academy Awards. The user, while watching a ceremony of the Academy Award, may want to query: "who is the best actor?". However such query lacks specificity as there is actually a plurality of best actors: male, female and critics' choice and popular choice. In this situation wherein a query is generic and not specific, the number of event identifiers may be great and therefore may quickly lead to the third route disclosed previously in relation to FIG. 4 (events having already occurred on the timeline and events not having yet occurred on the timeline). One way to handle the situation is to choose the first path and/or the second path so that a response to the query can be provided to the user. Another way to handle the situation is to choose the third path. In this path a request to specify the query is generated such that the user is invited to provide an input or a second query, more specific. In on example, the method of FIG. 3 is applied to that second query. Control circuitry 202 therefore receives 302 a second query, except that this query is more specific than the original query. For instance the second query is "who won the best female actor?". Determining 304 a type of the event based on the second query therefore outputs a different type than that of the previous query. However, because the second query is more specific, obtaining 308 the event distribution table for the content recording based on the type of the event will results in obtaining a different event distribution table than that of the previous query. More specifically, the number of events, and thus of event identifiers, is fewer. In the example of second query "who won the best female actor", the events associated with the event identifiers of the event distribution table are "best actor female critics' choice and best actor female popular choice" only. As the second query is more specific than the previous one, it means that the second event distribution table is included in the previous event distribution table. Then comparing 310 and generating 312 are performed as disclosed previously, which means that either of the three routes of FIG. 4 can apply.

To optimize the application of the process, instead of receiving a second query as it was a new query, control circuit 202 can receive an input specifying the (previous) query. For instance, the user can provide information "female" instead of repeating the query with more precision as in "who won the best female actor?". In addition, determining 304 the type of the event based on the query is performed to identify the input specifying the query so that server 114 performs filtering the event distribution table based on the received input to generate a filtered event distribution table. That filtered distribution table includes fewer event identifiers. As such, control circuitry 202 needs not to reobtain or regenerate from scratch an event distribution table but rather can reuse the table obtained for the previous query. The comparing 312 and generating 314 are then performed as disclosed previously, which means again that either of the three route of FIG. 4 can apply. Eventually if the request is specific enough, the process will fall in the first or the second route of FIG. 4. More details about the specified query are given later in relation to FIG. 9.

As indicated above, the query is typically a natural language query, which means that the query corresponds to a question a user could be asking to another human. The query may be received in a written form or a voice form. For the latter, a speech recognition module at the server 114 can be executed to convert the voice form into a written form. Alternatively, the query may comprise a list of keywords or predetermined question which were chosen by the user from a list, such that the type of event is more easily determined.

To determine the type of the event based on the query, control circuitry processes the query (typically a natural language query) as described above. The output. i.e. the identified words or concepts, is compared with an event type database 910, as illustrated on FIG. 9. The event type database 910 is a table that is comprised of events 912 occurring during the content recording. The event type database 910 may comprise different events fields describing features of the event, including event fields "occurrence time" 914, and "event identifier" 916. Other event fields are possible, in function of the kind of the content recording. An event field has a label ("nature", "player", "score", etc.) and every event field has a value (for label "nature": "foul", "goal", etc.; for label "assist": "Figo", "Benz").

Event identifier 916 may be a unique alphanumerical value used to identify an event or a unique way to identify an event. The event identifier 916 may be the combination of all the values of the event fields, as long as it ensures that the identifier is unique. The event identifier is used to precisely address the value of each event field. For instance, "player" value of event whose event identifier value is "EV-G-1" is "Ronaldo".

Each event field may be filled by a value, which may be a number, a series of number, a string, etc. For instance, for a soccer game as illustrated on FIG. 9, values for "nature of the event" can be: "goal scored", "foul", "yellow card", "red card", etc. and other event fields may be: "player", "score", "assist", etc. The event type database 910 is generated by means of metadata associated with events of the content recording. Metadata may be used to both create the field events and the value of those field events. Those metadata can be generated by the content recording provider, and for instance stored on the content recording database 116 along with the content recording. Alternatively or complementarily, the server 114 or any other server can process the content recording to generate those metadata. Alternatively or complementarily, the server 114 or any other server can collect information from different sources and convert them into metadata associated with the content recording. The event type database 910 may be stored on server 114 or any other storage.

Typically, identifying the type of the query consists in matching a word or concept of the query with a value of an event field (for instance event field "nature") of the event type database 910. Matching a word or concept of the query with the label of an event field (for instance "player") of the event type database 910 is used to determine which data the reply must include (for instance the data may include the value of the event field "player": "Ronaldo" or "Suarez").

For example, query "who scored the goal?" will be processed as follows: "goal" is associated with the value "goal" of the "nature" event field and "who" is associated with the event field "player". The type of the query is therefore the value "goal" in the event field "nature". With such processing, it is understood that the appropriate reply to the query is the actual value of the event field "player" for every event with a value "goal" in the event field "nature". Therefore, data about the event corresponding to an event identifier is comprised of the value in the field "player". More data from values of other event fields can also be included in the reply, such as "assist".

For example, query "what happened between Figo and Ronaldo?" will be processed as follows: "Figo" is associated with the value "Figo" of the "assist" event field and "Ronaldo" is associated with the "Ronaldo" of the "player" event field, and "what" is associated with the event field label "nature". Therefore data about the event corresponding to an event identifier is comprised of the value in the event field "nature" ("goal", according to FIG. 9).

The event type database 910 may comprise different categories (sports, movies, documentaries, TV show, etc.) and subcategories (soccer, basketball, curling, etc.) in function of the kind of the event recording. The kind of the event recording is usually easily known by the control circuitry 202 thanks to the general metadata associated with the content recording. This enables the control circuitry 202 to determine the type of the event only amongst the appropriate category or sub-category. The event type database 910 comprises a limited number of fields with a limited number of values. If no value of an event field and/or no event field label can be matched with a word or a concept of the query, then the method ends. This typically comprises generating for visual or aural display a reply indicating that the query could not be processed.

The event distribution table 902 may be obtained from the event type database 910, by extracting from, or filtering, the latter with the type identified of the event, that is to say with a particular value of an event field ("goal" for instance). It is therefore understood that the event distribution table 902 can be extracted from an event type database 910 which includes events unrelated to the query. While two different expressions ("event distribution table" and "event type database") have been used, the two are preferably similar objects, such that the event type database table 910 is an event distribution table 902 which is not limited to the events of the same type of that of the request. For instance, in FIG. 9, the event distribution table 902 is extracted from the event type database 910 for which the value of the event field "nature" is "goal". It is observed that there are two events 156 satisfying that condition.

In another example, given above, for a query "what happened between Figo and Ronaldo?", the event distribution table 902 is extracted from the event type database 910 for which the value of the event field "player" is "Ronaldo" and the value of the event field "assist" is "Figo". It is observed that there is one event satisfying that condition.

As explained above, data comprised in the generated reply includes the value of the event label identified in the query. This will ensure that the reply is relevant to the user.

In the embodiment described in relation with FIG. 8, typically the event type database can comprise "Oscar winner" as a value of event field "nature", "Male" or "Female" as values of event field "Gender", "Critics" and "Popular" as event field "award". Thus, a query "who won the Oscar?" will be identified as a type "Oscar winner" in the event field "nature" and the event distribution table will be comprised of all the events whose value for "nature" is "Oscar winner". Following the request to specify, the server 114 may receive input "female". Therefore, the type of the query is now "Oscar winner" in the event field "nature" and "female" in the event field "gender". The event distribution table, filtered from the previous one, will include, amongst the events whose value for "nature" is "Oscar winner", the events whose value for "gender" is "female". The filtered distribution table therefore include fewer events. This can go on with a further input including the value "popular" for event field "award", such that the size of the event distribution table keeps decreasing.

Alternatively, event fields "gender" and "award" can be included as different values of event field "nature". Thus, event field "nature" could be comprised of the following values: "Oscar winner best actor male critics' choice", "Oscar winner best actor male popular choice", "Oscar winner best actor female critics' choice", "Oscar winner best actor female popular choice". Thus, the type of query "who won the Oscar?" is any value of event field "nature" which includes "Oscar". Upon specification of the query, the type of the query becomes any value of event field "nature" which includes "Oscar" and "female". The result is therefore equivalent to having separate event fields.

Figure 10:
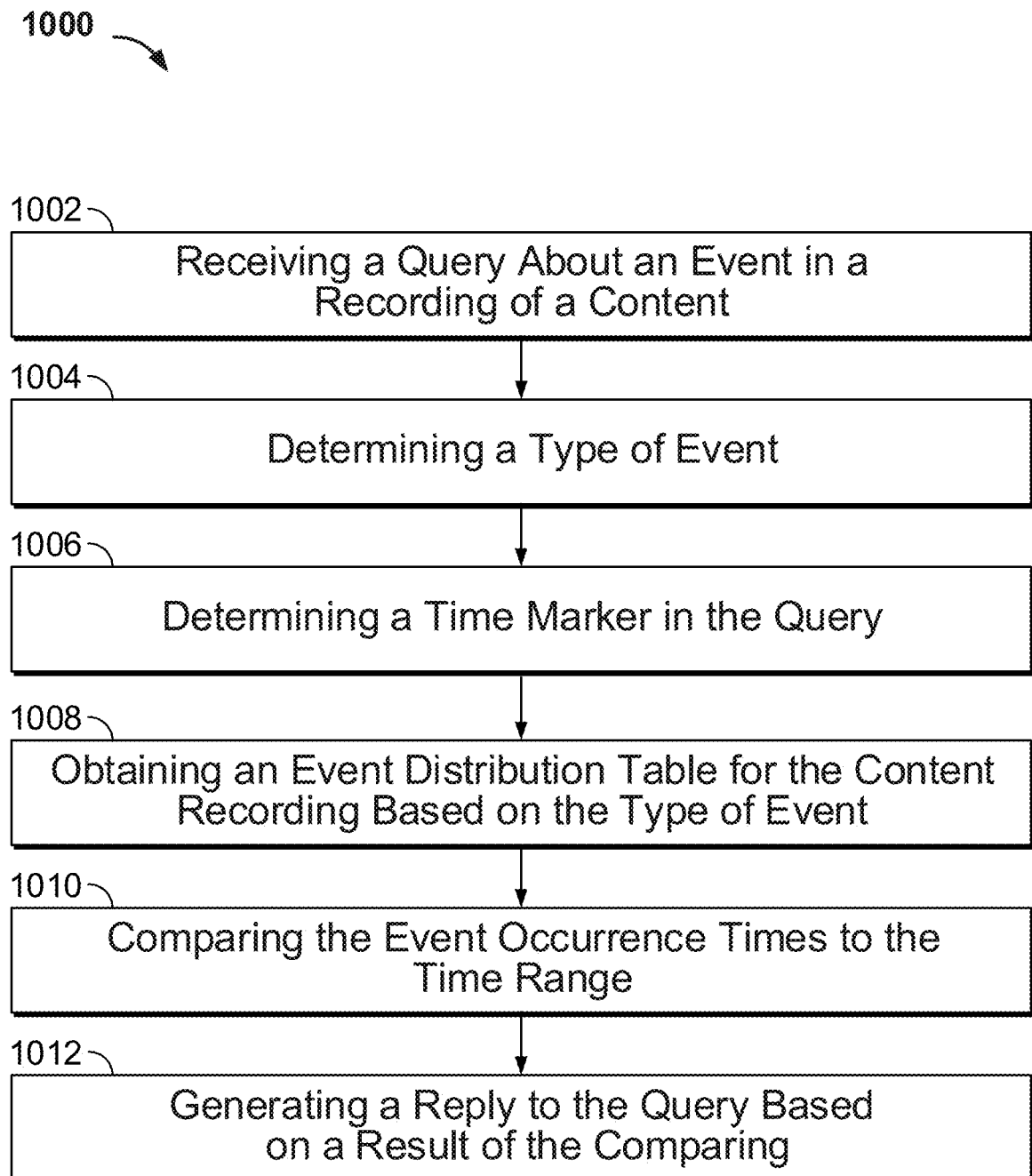
FIG. 10 depicts an illustrative flowchart representing of a process for responding to query comprising a time marker.

Reference is now made to FIG. 10, which depicts an illustrative flowchart of process 1000 which address a situation in which the query includes a time marker. Receiving 1002 and determining 1004 are similar to receiving 302 and determining 304. However, process 1000 further comprises determining 1006 a time marker in the query. A time marker in the query defines a time range on the recording timeline. For instance, a time marker is "until now", "after now", "between the beginning and now", etc. It therefore splits the content recording into two parts: one that is included in the time range and one that is not included in the time range. In an embodiment, obtaining 1008 is also similar to obtaining 308, and the time range is taken into account when comparing 1010 event occurrence times of event identifier to the time range in order to generate 1012 a reply based on the at least one event whose event identifier is associated with an occurrence time that is within the time range. As the query was time specific, the process does not determine a playback position and does not compare the time occurrence with the playback position. Alternatively, obtaining the event distribution table comprises obtaining an event distribution table comprising one or more event identifiers and one or more corresponding occurrence times for the one or more event identifiers in the time range of the content recording. A step of filtering an event distribution table with event identifier from the whole content recording may be implemented. This way, there is no comparing 1010 as the time range was already taken into account in obtaining the event distribution table. Control circuitry 202 the generates a reply to the query comprising data about at least one event corresponding to the one or more event identifier of the event distribution table. When the user specifically indicates a timer marker in the question, the system assumes that no undesired spoiler is possible and will return a reply to the query.

Figure 11:
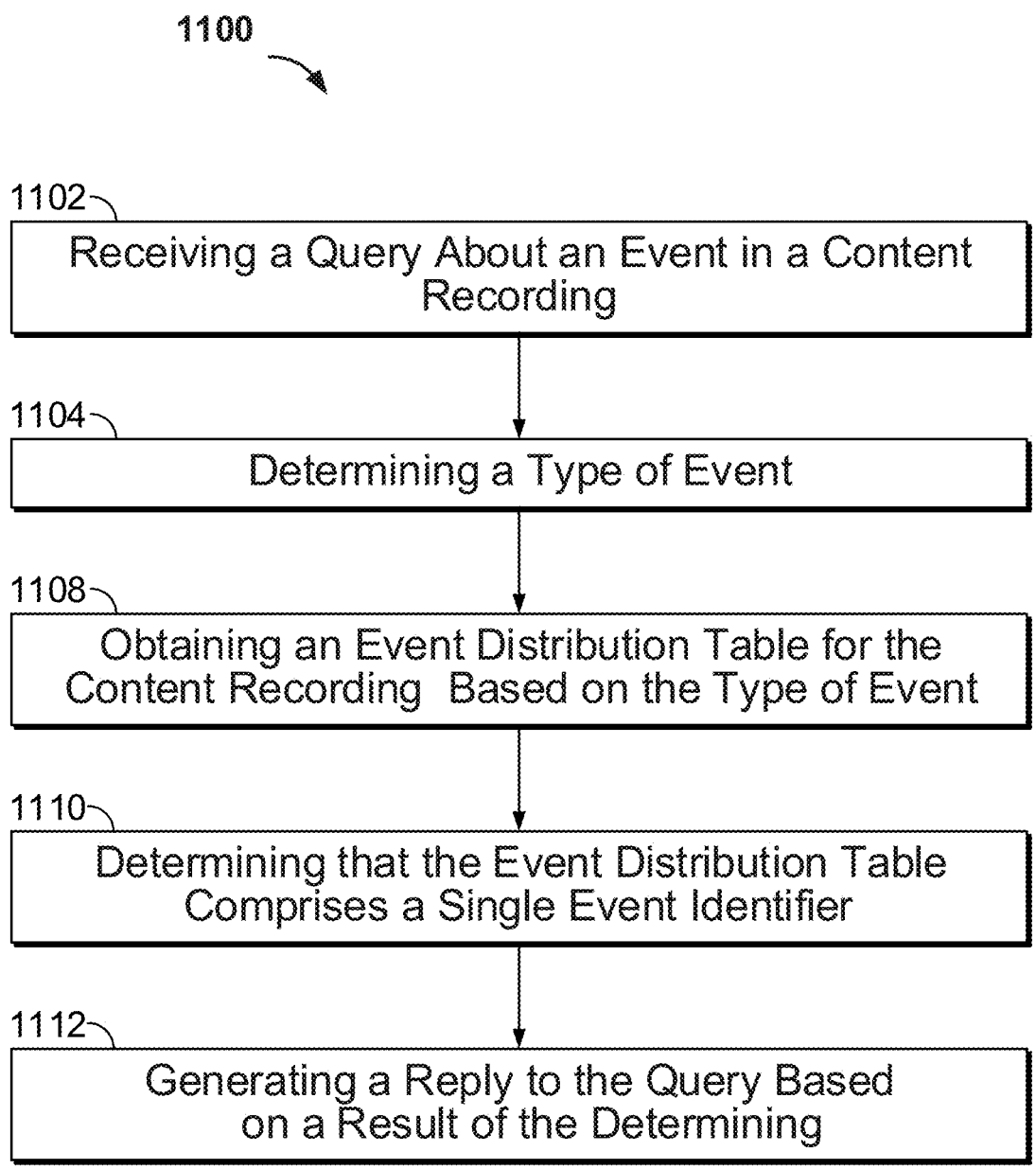
FIG. 11 depicts an illustrative flowchart representing of a process for responding to a query for the query is related to a single event.

Reference is now made to FIG. 11, which depicts an illustrative flowchart of process 1100 which addresses a specific situation in which the type of the event of the query comprises a single entry in the event distribution table.

In particular, receiving 1102, identifying 1104 and obtaining 1108 are similar to receiving 302, identifying 304 and obtaining 308. However process 1100 includes determining 1110 that the event distribution table comprises a single event identifier. Then control circuitry 202 performs generating 1112, for aural or visual presentation, a reply comprising data about the event corresponding to the single identifier. There is therefore no need to determine a playback position in the timeline of the content recording or to compare that playback position with the occurrence time of the event identifier. It is understood that when there is a single identifier, the request was specific enough and the user wants to know the answer, regardless of the playback position.

The systems and processes discussed above are intended to be illustrative and not limiting. One skilled in the art would appreciate that the actions of the processes discussed herein may be omitted, modified, combined, and/or rearranged, and any additional actions may be performed without departing from the scope of this disclosure. More generally, the above disclosure is meant to be exemplary and not limiting. Only the claims that follow are meant to set bounds as to what the present disclosure includes. Furthermore, it should be noted that the features and limitations described in any one embodiment may be applied to any other embodiment herein, and flowcharts or examples relating to one embodiment may be combined with any other embodiment in a suitable manner, done in different orders, or done in parallel. In addition, the systems and methods described herein may be performed in real time. It should also be noted that the systems and/or methods described above may be applied to, or used in accordance with, other systems and/or methods.

What is claimed is:

1. A method comprising:
   receiving a query associated with a consumer of content;
   determining, based on the query, an event associated with the content and an event position in the content based on the event;
   determining a playback position of the content associated with the consumer of content;
   determining whether the playback position is after the event position;
   in response to determining that the playback position is after the event position, providing a first portion of the content comprising content at the event position; and
   in response to determining that the playback position is not after the event play position, providing a second portion of the content comprising content before the event position.

2. The method of claim 1, wherein the query is generated by a voice-user interface.

3. The method of claim 2, wherein the voice-user interface is configured to receive a natural language query.

4. The method of claim 1, comprising obtaining an event distribution table associated with the content, wherein the event distribution table includes the event.

5. The method of claim 4, wherein the event distribution table comprises the event position based on the event.

6. The method of claim 4, wherein the content is a sporting event, and the event distribution table comprises at least one of a nature of the event, a player, a score, or an identifier.

7. The method of claim 1 further comprising obtaining a knowledge graph associated with the content, wherein the knowledge graph includes the event.

8. The method of claim 7 further comprising:
   determining that a number of replies to the query is greater than a predetermined threshold; and
   in response to determining that the number of replies to the query is greater than the predetermined threshold, prompting additional input or a second query, wherein the additional input or the second query is more specific than the query.

9. The method of claim 1, comprising:
   in response to the determining that the playback position is not after the event position, prompting a confirmation before preventing the generation or the display of the first portion of the content comprising content at the event position; and
   in response to receiving the confirmation, generating for display the first portion of the content comprising content at the event position instead of providing a second portion of the content comprising content before the event position.

10. The method of claim 1, comprising determining a time marker in the query, wherein the time marker is at least one of the playback position, a time range on a timeline of the content, or a natural language portion of the query.

11. A system comprising:
    memory;
    control circuitry configured to:
       receiving a query associated with a consumer of content, wherein the query is stored in the memory;
       determining, based on the query, an event associated with the content and an event position in the content based on the event;
       determining a playback position of the content associated with the consumer of content;
       determining whether the playback position is after the event position;
       in response to determining that the playback position is after the event position, providing a first portion of the content comprising content at the event position; and
       in response to determining that the playback position is not after the event play position, providing a second portion of the content comprising content before the event position.

12. The system of claim 11, wherein the query is generated by a voice-user interface.

13. The system of claim 12, wherein the voice-user interface is configured to receive a natural language query.

14. The system of claim 11, wherein the control circuitry is configured to obtain an event distribution table associated with the content, wherein the event distribution table includes the event.

15. The system of claim 14, wherein the event distribution table comprises the information play event position based on the event.

16. The system of claim 14, wherein the content is a sporting event, and the event distribution table comprises at least one of a nature of the event, a player, a score, or an identifier.

17. The system of claim 11, wherein the control circuitry is further configured to obtain a knowledge graph associated with the content, wherein the knowledge graph includes the event.

18. The system of claim 17, wherein the control circuitry is further configured to:
    determine that a number of replies to the query is greater than a predetermined threshold; and
    in response to determining that the number of replies to the query is greater than the predetermined threshold, prompt additional input or a second query, wherein the additional input or the second query is more specific than the query.

19. The system of claim 11, comprising:
    in response to the determining that the playback position is not after the event position, prompt a confirmation before preventing the generation or the display of the first portion of the content comprising content at the event position; and
    in response to receiving the confirmation, generate for display the first portion of the content comprising content at the event position instead of providing a second portion of the content comprising content before the event position.

20. The system of claim 11, wherein the control circuitry is configured to determine a time marker in the query, wherein the time marker is at least one of the playback position, a time range on a timeline of the content, or a natural language portion of the query.

\* \* \* \* \*